(12) United States Patent
Subbaraya et al.

(10) Patent No.: US 11,734,569 B2
(45) Date of Patent: Aug. 22, 2023

(54) METHOD AND SYSTEM FOR IMPROVING PERFORMANCE OF AN ARTIFICIAL NEURAL NETWORK (ANN) MODEL

(71) Applicant: Wipro Limited, Bangalore (IN)

(72) Inventors: Prashanth Krishnapura Subbaraya, Bengaluru (IN); Raghavendra Hosabettu, Bangalore (IN)

(73) Assignee: Wipro Limited, Karnataka (IN)

(*) Notice: Subject to any disclaimer, the term of this patent is extended or adjusted under 35 U.S.C. 154(b) by 510 days.

(21) Appl. No.: 16/833,693

(22) Filed: Mar. 30, 2020

(65) Prior Publication Data

US 2021/0256381 A1 Aug. 19, 2021

(30) Foreign Application Priority Data

Feb. 14, 2020 (IN) .............................. 202041006415

(51) Int. Cl.
*G06N 3/082* (2023.01)
*G06N 3/04* (2023.01)
*G06F 18/23* (2023.01)

(52) U.S. Cl.
CPC .............. *G06N 3/082* (2013.01); *G06F 18/23* (2023.01); *G06N 3/04* (2013.01)

(58) Field of Classification Search
CPC combination set(s) only.
See application file for complete search history.

(56) References Cited

U.S. PATENT DOCUMENTS 5,263,124 A * 11/1993 Weaver ............. G06F 18/24323
382/226
10,460,236 B2 * 10/2019 Ogawa ..................... G06N 3/04
10,832,139 B2 * 11/2020 Yan ........................ G06N 3/084
(Continued)

FOREIGN PATENT DOCUMENTS

CN 109409501 * 3/2019 ............... G06N 3/04

OTHER PUBLICATIONS

Aghasi, A., et al., "Net-Trim: Convex Pruning of Deep Neural Networks", NIPS 2017, 10 pages.
(Continued)

*Primary Examiner* — Zhiyu Lu
(74) *Attorney, Agent, or Firm* — Finnegan, Henderson, Farabow, Garrett & Dunner, LLP

(57) ABSTRACT

The disclosure relates to method and system for improving performance of an artificial neural network (ANN) model. The method includes receiving the ANN model and input dataset. The ANN model includes neurons arranged in multiple layers and employing corresponding activation functions. The method further includes assigning a random activation threshold value to each of the corresponding activation functions, determining activated neurons in each layer for a majority of input data in the input dataset based on the random activation threshold value for each of the corresponding activation functions, identifying removable layers based on a number of activated neurons and a pre-defined threshold value, evaluating a relative loss of the ANN model upon removing each removable layer from the ANN model and for a random input data in the input dataset, and deriving a modified ANN model by removing one or more of the removable layers based on the evaluation.

20 Claims, 4 Drawing Sheets

(56) References Cited

U.S. PATENT DOCUMENTS

| | | | |
|---|---|---|---|
| 2019/0087729 A1* | 3/2019 | Byun | G06N 3/045 |
| 2019/0095819 A1* | 3/2019 | Varadarajan | G06F 9/505 |
| 2019/0147339 A1* | 5/2019 | Nachum | G06N 3/084 |
| | | | 706/25 |
| 2020/0202214 A1* | 6/2020 | Peranandam | G06N 3/04 |
| 2020/0202218 A1* | 6/2020 | Csefalvay | G06N 3/06 |

OTHER PUBLICATIONS

Lin, J, et al., "Runtime Neural Pruning", NIPS 2017, 11 pages.
Dong, X., et al., "Learning to Prune Deep Neural Networks via Layer-wise Optimal Brain Surgeon", NIPS 2017, 15 pages.

* cited by examiner

METHOD AND SYSTEM FOR IMPROVING PERFORMANCE OF AN ARTIFICIAL NEURAL NETWORK (ANN) MODEL

TECHNICAL FIELD

This disclosure relates generally to artificial neural network (ANN); and more particularly to method and system for improving performance of an ANN model.

BACKGROUND

In today's world, an increasing number of applications are utilizing machine learning (ML) to extract useful information and to make predictions. One of the dominant approaches to ML is artificial neural network (ANN). Typically, ML models for performing complex tasks involving large datasets deploy ANN with multiple layers of neurons that include an input layer, an output layer, and multiple hidden layers. For example, a deep learning model for an image processing application may employ convolutional neural networks (CNN) such as ImageNet, ResNet, etc. that include several layers. As will be appreciated; such complex ANN models demand extremely high-end processors for performing complex processing so as to provide a real-time and accurate predictions.

However, many a times high-end infrastructure may be not available to deploy such complex ANN model. It may, therefore, be desirable to optimize the ANN model such that they may be deployed with nominal or minimal infrastructure while providing real-time and accurate predictions. Existing techniques to optimize the ANN models are limited in their scope, utility and applications, particularly with respect to real-time applications. For example, a traffic density prediction model, developed for an automatic signal controller may receive a continuous stream of new inputs (say, 24 frames/second). In such cases, the time taken to perform predictions is high and not as per the needs of the application.

SUMMARY

In one embodiment, a method for improving performance of an artificial neural network (ANN) model is disclosed. In one example, the method may include receiving the ANN model and input dataset. The ANN model may include a plurality of neurons arranged in a plurality of layers and employing a plurality of corresponding activation functions. The method may further include assigning a random activation threshold value to each of the plurality of corresponding activation functions. The random activation threshold value may be selected from a pre-defined range for each of the plurality of corresponding activation functions. The method may further include determining a set of activated neurons in each of the plurality of layers for a majority of input data in the input dataset, based on the random activation threshold value for each of the plurality of corresponding activation functions. The method may further include identifying a set of removable layers based on a number of activated neurons in the set of activated neurons and a pre-defined threshold value. The method may further include evaluating a relative loss of the ANN model upon removing a removable layer from the ANN model, for each of the set of removable layers and for a random set of input data in the input dataset. The method may further include deriving a modified ANN model by removing one or more of the set of removable layers based on the evaluation.

In another embodiment, a system for improving performance of an artificial neural network (ANN) model is disclosed. In one example, the system may include a processor and a memory communicatively coupled to the processor. The memory may store processor-executable instructions, which, on execution, may causes the processor to receive an ANN model and input dataset. The ANN model may include a plurality of neurons arranged in a plurality of layers and employing a plurality of corresponding activation functions. The processor-executable instructions, on execution, may further cause the processor to assign a random activation threshold value to each of the plurality of corresponding activation functions. The random activation threshold value may be selected from a pre-defined range for each of the plurality of corresponding activation functions. The processor-executable instructions, on execution, may further cause the processor to determine a set of activated neurons in each of the plurality of layers for a majority of input data in the input dataset, based on the random activation threshold value for each of the plurality of corresponding activation functions. The processor-executable instructions, on execution, may further cause the processor to identify a set of removable layers based on a number of activated neurons in the set of activated neurons and a pre-defined threshold value. The processor-executable instructions, on execution, may further cause the processor to evaluate a relative loss of the ANN model upon removing a removable layer from the ANN model, for each of the set of removable layers and for a random set of input data in the input dataset. The processor-executable instructions, on execution, may further cause the processor to derive a modified ANN model by removing one or more of the set of removable layers based on the evaluation.

In yet another embodiment, a non-transitory computer-readable medium storing computer-executable instruction for improving performance of an artificial neural network (ANN) model is disclosed. In one example, the stored instructions, when executed by a processor, may cause the processor to perform operations including receiving an ANN model and input dataset. The ANN model may include a plurality of neurons arranged in a plurality of layers and employing a plurality of corresponding activation functions. The operations may further include assigning a random activation threshold value to each of the plurality of corresponding activation functions. The random activation threshold value may be selected from a pre-defined range for each of the plurality of corresponding activation functions. The operations may further include determining a set of activated neurons in each of the plurality of layers for a majority of input data in the input dataset, based on the random activation threshold value for each of the plurality of corresponding activation function. The operations may further include identifying a set of removable layers based on a number of activated neurons in the set of activated neurons and a pre-defined threshold value. The operations may further include evaluating a relative loss of the ANN model upon removing a removable layer from the ANN model, for each of the set of removable layers and for a random set of input data in the input dataset. The operations may further include deriving a modified ANN model by removing one or more of the set of removable layers based on the evaluation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
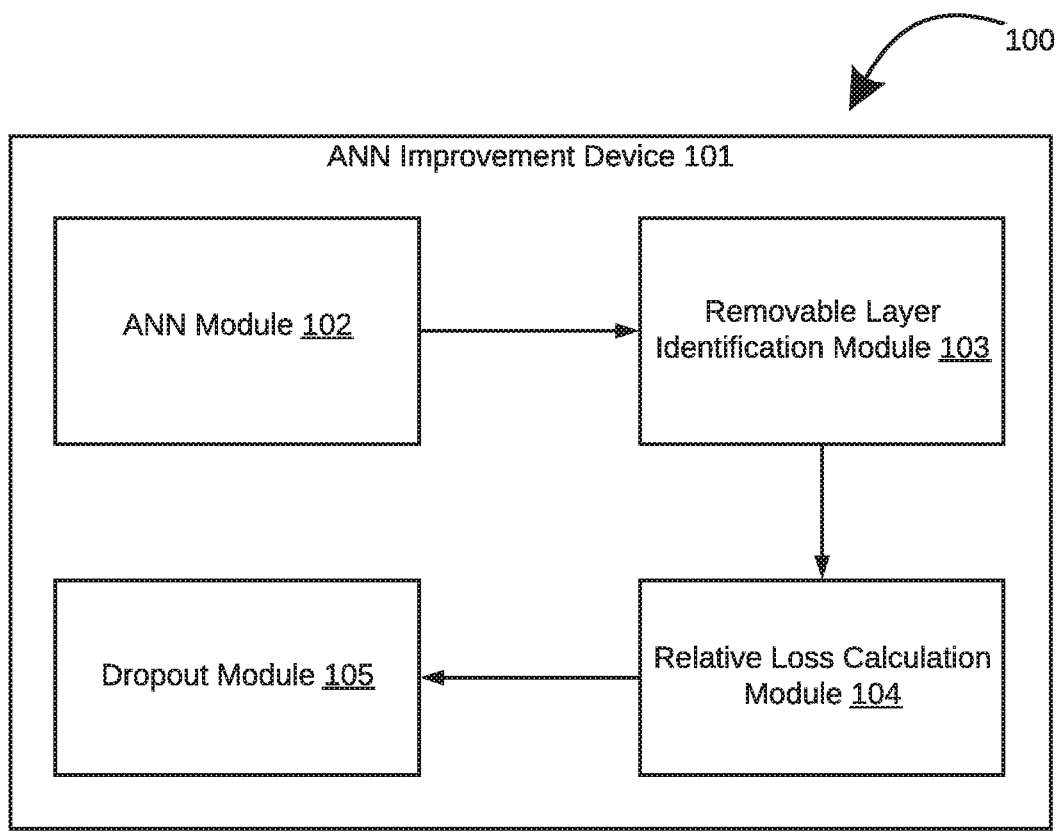
FIG. 1 is a block diagram of an exemplary system including an ANN improvement device for improving performance of an artificial neural network (ANN) model, in accordance with some embodiments of the present disclosure.

Referring now to FIG. 1, an exemplary system 100 including an ANN improvement device 101 for improving performance of an artificial neural network (ANN) model is illustrated, in accordance with some embodiments of the present disclosure. The ANN improvement device 101 further includes an ANN module 102, a removable layer identification module 103, a relative loss calculation module 104, and a dropout module 105. The ANN module 102 builds, trains, and deploys an artificial neural network (ANN) model for a specific application. For example, the ANN module 102 may build, train, and deploy the ANN model for a real-time image processing application (e.g., a traffic density prediction model for an automatic signal controller) or a real-time language processing application (e.g., natural language processing model for a live closed captioning). The ANN module 102 may accept a variety of input datasets from its input peripheral.

The ANN model may be developed based on the input dataset. The input dataset may be a training dataset (for training the ANN model) or a test dataset (for testing the ANN model). Further, the type of input dataset may depend upon the application for which the ANN model is developed. For example, for the traffic density prediction model, the input dataset may include images of the traffic acquired via a camera. The ANN module 102 may then train the traffic density prediction model with all the possible images related to different traffic density classes like high density class, low density class, moderate density class, etc. so as to predict traffic density in real-time. As will be appreciated, such prediction may enable automation of the traffic signal based on the predicted density. The ANN module 102 may be operatively coupled to the removable layer identification module 103. Thus, the output of the ANN module 102 (i.e., the ANN model and the input dataset) may be provided to the removable connected layer identification module 103.

The removable layer identification module 103 receives the output from the ANN module 102. The removable layer identification module 103 then identifies a set of removable layers (also referred to as unwanted layers) in the ANN model. The set of removable layers includes those layers, which on exclusion from the ANN model, may not affect the output of the ANN model. As will be described in greater detail herein below, the removable layer identification module 103 dynamically tunes each of a number of activation functions (for example, ReLU, Sigmoid, or hyperbolic tangent) corresponding to each of a number of neurons (arranged in various layers of the ANN model) so as to identify the set of removable layers.

Initially, the removable layer identification module 103 assigns a random activation threshold value from a pre-defined range of value to each of the activation functions corresponding to each of the neurons. For example, the pre-defined range for ReLU [R(z)=max (0, z)] activation function may be $0.01-z/2$. Further, the removable layer identification module 103 executes the ANN model for a majority of input data in the input dataset (e.g., 80% of data in the training dataset, 90% of data in the test dataset, etc.) so as to determine a set of activated neurons in each of the layers of the ANN model. In particular, the removable layer identification module 103 determines an activation value corresponding to each of the neurons. When the determined activation value for a neuron exceeds the assigned random activation threshold value for that neuron, then that neuron may be considered as activated neuron. It should be noted that the activated neurons correspond to the active features in the input data. Further, the removable layer identification module 103 identifies removable layers based on a number of activated neurons in each of the layers of the ANN model and a pre-defined threshold value. Thus, if the number of activated neurons in a layer is less than the pre-defined threshold value (e.g., one activated neuron, three activated neurons, etc.), then that layer is considered as a removable layer. The removable layer identification module 103 is further communicatively coupled to the relative loss calculation module 104.

The relative loss calculation module 104 receives the output (i.e., identified removable layers) transmitted by the removable layer identification module 103. The relative loss calculation module 104 evaluates the relative loss of the ANN model upon removing each of the set of identified removable layers in the ANN model. The relative loss calculation module 104 evaluates the relative loss based on a random set of input data in the input dataset. As will be described in greater detail in conjunction with FIG. 2, in some embodiments, the relative loss calculation module 104 may evaluate the relative loss for a removable layer by determining a control event rate (CER) and Experimental event rate (EER) based on correct predictions made by the ANN model upon removing that layer for the random set of input data. Further, the relative loss calculation module 104 is communicatively coupled to the dropout module 105 for subsequent processing.

The dropout module 105 receives the output (i.e., relative loss for each of the identified removable layers) generated by the relative loss calculation module 104. Based on the received information, the dropout module 105 drops the one or more of the set of identified removable layers from the ANN model such that there is negligible impact on or a reduction in the relative loss. As will be appreciated, the removal of removable layers will decrease the complexity of the ANN model, thereby increasing efficiency and performance of the ANN model (i.e., reduced processing time, reduced high-end processing requirement, etc.) without impacting the accuracy of the original ANN model. In particular, the dropout module 105 derives a modified ANN model by removing one or more of the set of removable layers from the ANN model. The modified ANN model is better in terms of efficiency and performance while performing predictions.

It should be noted that the ANN improvement device 101 may be implemented in programmable hardware devices such as programmable gate arrays, programmable array logic, programmable logic devices, or the like. Alternatively, the ANN improvement device 101 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for improving performance of an ANN model. For example, the exemplary system 100 and the associated ANN improvement device 101 may improve the performance of the ANN model, by the process discussed herein. In particular, as will be appreciated by those of ordinary skill in the art, control logic and/or automated routines for performing the techniques and steps described herein may be implemented by the system 100 and the associated ANN improvement device 101 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 2:
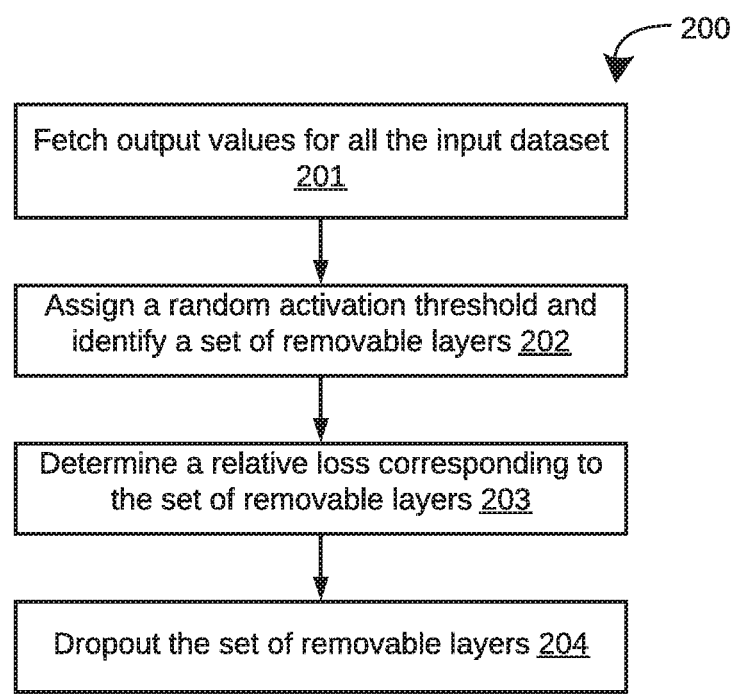
FIG. 2 is a flow diagram of an exemplary process overview for improving performance of an ANN model; in accordance with some embodiments of the present disclosure.

Referring now to FIG. 2, an exemplary process overview for improving performance of an ANN model is depicted via a flowchart, in accordance with some embodiments of the present disclosure. As will be appreciated, various steps of the process 200 are performed by various modules 102-105 present within the ANN improvement device 101 of FIG. 1.

At step 201, output values for a random data in the input dataset (i.e., training or test dataset) may be fetched. As stated above, the training dataset is used to train the ANN model, while the test dataset is used to test the ANN model. By the way of an example, consider a CNN-based multi-layer binary image classifier that may be trained to perform the classification operation based on a traffic density associated with traffic signals. Once the CNN-based multi-layer binary image classifier is trained, the training dataset may be used to get the predictions. After training, the CNN-based multi-layer binary image classifier the predicts results for each of the data of test dataset.

At step 202, a random activation threshold value may be selected and assigned to the ANN model, and a set of removable layers may be identified. Herein, the input dataset is fed to the ANN model and the random activation threshold value may be assigned to the neuron activation function. The neurons that get activated after crossing the assigned random threshold value may be considered as the features responsible for an output generated by the ANN model. It should be noted that the activated neurons list in various layers for a majority of input data in the input dataset is taken into consideration. Based on the activated neurons for the majority of input data, relevant features in the ANN model may be determined. In other words, neurons that are activated for the majority of input data may be identified. A layer, for which a value corresponding to a number of activated neurons is less than the pre-defined threshold value, may be considered as removable layer.

By the way of an example, consider a CNN classifier with a ReLU activation function (i.e. a non-linear activation function), The ReLU function is given as per equation (1) below:

$$R(z) = \max(0, z) \tag{1}$$

Here, it may be noted that the range of the activation function starts from 0 (zero) and ends at a positive definite value 'z'. In this example, the activation threshold value is zero. So, the neurons for which the activation value are higher than the activation threshold value of '0' for a given input data may be considered as activated neurons.

Now, consider three different classes of traffic density, i.e., a high-density class, a low-density class and a moderate density class. All or a majority of data from the input datasets may be taken into consideration. The random activation threshold value may be selected from a pre-defined range (say, 0.05 to z/2). In some embodiments, step 202 is iteratively implemented for each of the selected random threshold values between 0.05 and z/2 (for example, the selected random threshold values may be 0.05, 0.1, 0.15, 0.2, . . . z/2). Alternatively, steps of 202 and 203 is iteratively implemented in combination till an increase in the relative loss of the ANN model is observed. In one example with the random activation threshold value selected as 0.1, one layer of the ANN model holds only four neurons, with weights [−0.2, −0.4, −0.5, −0.01]. When the input values are multiplied with the weights, all the neurons produce negative values, which is obviously less than the selected random activation threshold value '0.1'. Therefore, all the neurons in this layer are considered as unwanted features. This process may be repeated multiple times for all the input data in the input datasets belonging to each of the classes and an intersection of activated neurons may be identified. Further, if the layer has no activated neurons or activated neurons less than a pre-defined value (say, 3) then that layer may be identified as a removable layer.

At step 203, the relative loss corresponding to each of the set of removable layers may be determined. First, some of the input data from the input dataset may be randomly selected (a first random set of input data) and passed through the ANN model to observe correct predictions. It should be noted that these values corresponding to correct predations may be considered as control events. Thereafter, a removable layer may be dropped out from the ANN model. Again, some randomly selected input data (a second random set of input data) from the input dataset may be passed through the ANN model (with the layer removed) to get a number of correct predictions. It should be noted that these values are considered as experimental events. Further, it should be noted that the first random set and the second random set may be same or different. After determining both control events and experimental events, a control event rate and an experimental event rate may be determined.

The control event rate and experimental event rate may be determined as per equation (2) and equation (3) below:

Control Event Rate (CER)=Number of correct predictions (During control event run)/Total number of input datasets (2)

Experimental Event Rate (EER)=Number of correct predictions (During experimental event run)/Total number of input datasets (3)

Afterwards, a relative loss value for the removable layer is calculated as per equation (4) below:

Relative Loss (RL)=(EER−CER)/CER (4)

As will be appreciated, the step 203 may be performed for each of the set of removable layers for the ANN model. Also, as will be appreciated, the step 203 may be performed for the set of removable layers identified for each of the selected random activation threshold values in the pre-defined range. Now, the layers along and corresponding relative loss value may be transmitted for further processing.

Consider an example, wherein the ANN model is trained by the input dataset comprising 1000 images. While determining the control events, 841 random images from the input dataset are taken and passed through the ANN model for prediction. It is observed that 386 results out of 841 are correct predictions. Thus, the Control Event Rate will be as follows:

CER=386/841=0.46 or 46%

Now, a first removable layer from the set of removable layers may be removed and 822 images are randomly selected from the input dataset. It is observed that the model is generating 284 correct predictions out of 822. Accordingly, the Experimental Event Rate will be as follows:

EER=284/822=0.35 or 35%

Thus, the relative loss for dropping the first removable layer from the ANN model will be as follows:

RL=(0.35−0.46)/0.46=−0,24 or −24%

From the calculations, it is noted that the obtained relative loss is negative, or the relative loss is reduced after removing the first layer from the ANN model. Hence, it is appropriate to remove the first layer from the ANN model or to consider the first layer in the set of removable layers. As stated above, the step is repeated for all of the removable layers in the set of removable layers and for all the random activation threshold values selected from the pre-defined range.

At step 204, one or more of the set of removable layers may be dropped out from the ANN model, based on their respective relative loss evaluation, so as to get a modified ANN model. The relative loss associated with each of the set of removable layers may be received in this step, Thereafter, the relative loss corresponding to each of the set of removable layers may be analyzed, in order to know the one or more of the removable layers which lessens or don't affect the relative loss in the ANN model (say, relative loss remains same or become lower after removing the one or more of the set of removable layers). In other words, the one or more removable layers may be identified that reduces the overall relative loss or does not increase the relative loss of the ANN model. Thus, when the evaluated relative loss value corresponding to a particular layer is greater than 0, then that layer may not be dropped out of the ANN model as the layer is increasing the relative loss, when removed. On the other hand, when the value of relative loss corresponding to a layer exhibits a lesser or equal value of relative loss, when compared with 0, then that layer is removed from the ANN model. Thereafter, the identified one or more removable layers may be dropped out of the ANN model to generate the modified ANN model.

Hence, a new ANN model is obtained with a lesser number of layers after removing one or more of the identified set of removable layers. The new ANN model may be termed as modified ANN model and the modified ANN model may be stored in a data store for further use. It should be noted that the activation threshold value for the modified ANN model may be the random activation threshold value selected for identifying the set of removable layers. As will be appreciated, the modified ANN model performs predictions in a better way than the initial ANN model.

Figure 3:
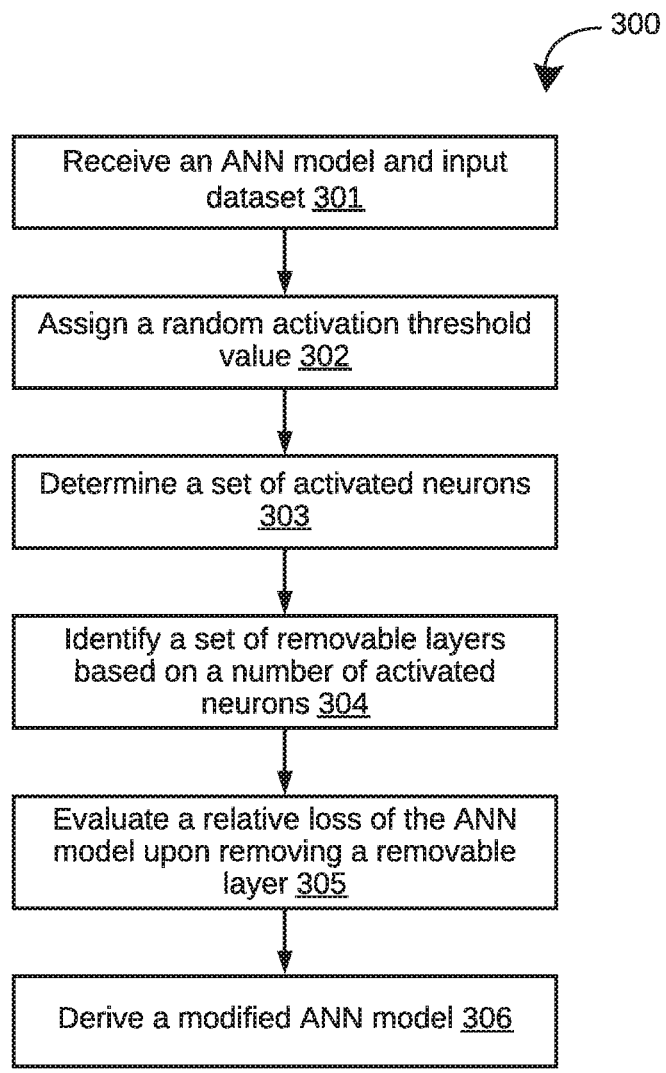
FIG. 3 is a flow diagram of an exemplary process for improving performance of an ANN model, in accordance with some embodiments of the present disclosure.

Referring now to FIG. 3, exemplary process 300 for improving performance of an ANN model is depicted via a flowchart, in accordance with some embodiments of the present disclosure. At step 301, an ANN model and input dataset is received by the ANN improvement device 101. It should be noted the ANN model may include a plurality of neurons arranged in a plurality of layers. Additionally, it should be noted that the plurality of neurons may employ a plurality of corresponding activation functions. In particular, each neuron may employ a corresponding activation function. It should be noted that, in some embodiments, all the neurons in a layer or all the neurons in the ANN model may employ same activation function. In some embodiments, the ANN model may be a deep learning model that is trained for a specific application. For example, in some embodiments, the deep learning model may be trained for a real-time image processing application or a real-time language processing application. Further, at step 302, a random activation threshold value is assigned to each of the plurality of corresponding activation functions. It should be noted, the random activation threshold value may be selected from a pre-defined range for each of the plurality of corresponding activation functions. In some embodiments, the pre-defined range for an activation function may be provided by the user based on the activation function For example, for ReLU activation function [R(z)=max (0, z)], the pre-defined range may be (0, z/2), i.e., from 0 (zero) to z/2.

At step 303, a set of activated neurons is determined in each of the plurality of layers for a majority of input data in the input dataset. It should be noted that the determination of the set of activated neurons is based on the random activation threshold value for each of the plurality of corresponding activation functions. Additionally, it should be noted that, in some embodiments, the input dataset may include one of: training dataset for training the ANN model, or test dataset for testing the ANN model. Further, it should be noted that, in some embodiments, the majority of input data may include all of input data in the input dataset. At step 304, a set of removable layers is identified based on a number of activated neurons and a pre-defined threshold value for the number of activated neurons. In some embodiments, the pre-defined threshold value for the number of activated neurons in a layer may be provided by the user.

At step 305, a relative loss of the ANN model is evaluated upon removing a removable layer from the ANN model. It should be noted that the evaluation of the relative loss may be done for each of the set of removable layers and for a random set of input data in the input dataset. In some embodiments, a control event rate (CER) based on a number of correct predictions, made by the ANN model, for a first random set of input data is determined. Similarly, an experimental event rate (EER) is determined based on a number of correct predictions, made by the ANN model upon removing a given removable layer, for a second random set of input data. Further, the relative loss is determined for the given layer based on the control event rate and the experimental event rate. It should be noted that, in some embodiments, the first random set of input data and the second random set of input data may be different.

At step 306, a modified ANN model may be derived by removing one or more of the set of removable layers from the ANN model. It should be noted that the removal of the one or more removable layers may be based on the evaluation of respective relative losses. In some embodiments, the one or more removable layers may include removable layers whose removal result in an about same or a lower relative loss.

As will be appreciated, a number of iterations may be performed by selecting a number of random activation threshold values from the pre-defined range. Thus, in some embodiments, a new random activation threshold value may be assigned to each of the plurality of corresponding activation functions. As stated above, the new random activation threshold value is selected from the pre-defined range for each of the plurality of corresponding activation functions (for e.g., (0, z/2) for ReLU activation function R(z)=max (0, z)). A set of new removable layers may be then identified based on the new random activation threshold value for each of the plurality of corresponding activation functions. Thereafter, for each of the set of new removable layers and for the random set of input data, the relative loss is evaluated for the ANN model upon removing a new removable layer from the ANN model.

In some embodiments, the new random activation threshold value is selected based on the previous random activation threshold value. In other words, the selection of the new random activation threshold value may not be quite random. Thus, for example, if the previously selected random activation threshold value is 0.05, then the new random activation threshold value may be 0.1. Further, for example, if the previously selected random activation threshold value is z/2−0.05, then the new random activation threshold value may be z/2−0.1. Further, for example, if the previously selected random activation threshold value is z/4, then the next two new random activation threshold values may be z/4+0.05 and z/4−0.05 (in any order) and the further two new random activation threshold values may be z/4+0.1 and z/4−0.1 (in any order).

As will be appreciated, in some embodiments, the iterations may be performed for each of a plurality of activation threshold values in the pre-defined range. In other words, the iterations are performed for all the activation threshold values in the pre-defined range. A most optimized ANN model (i.e., a modified ANN model with a maximum decrease in the relative loss and a maximum removal of the layers) is then selected from among all the modified ANN models from all the iterations. Alternatively, in some embodiments, the iterations may be performed till an increase in the relative loss of the ANN model is observed. In other words, the iterations are performed for different activation threshold values in the pre-defined range till the relative loss of a modified ANN model shows a decreasing or stagnant trend and is stopped when the relative loss of a modified ANN model starts increasing.

Figure 4:
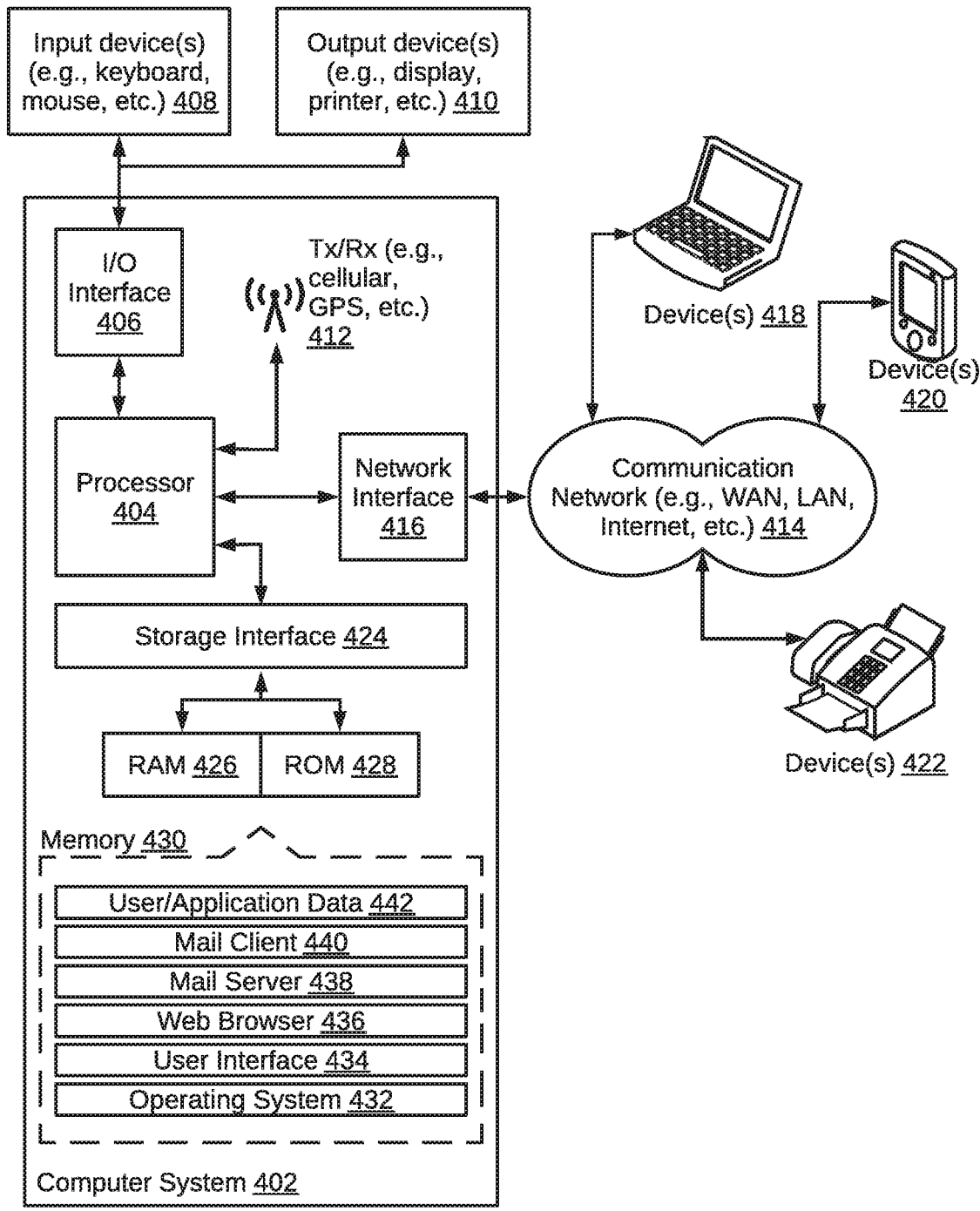
FIG. 4 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 402 for implementing various embodiments is illustrated. Variations of computer system 402 may be used for implementing system 100 or the associated ANN improvement device 101 for generating an improved ANN model (i.e., a modified AN model that is optimized for performance). Computer system 402 may include a central processing unit ("CPU" or "processor") 404. The processor 404 may include at least one data processor for executing program components for executing user-generated or system-generated requests. A user may include a person, a person using a device such as such as those included in this disclosure, or such a device itself. The processor 404 may include specialized processing units such as integrated system (bus) controllers, memory management control units, floating point units, graphics processing units, digital signal processing units, etc. The processor 404 may include a microprocessor, such as AMD® ATHLON® microprocessor, DURON® microprocessor or OPTERON® microprocessor, ARM's application, embedded or secure processors, IBM® POWERPC®, INTEL® CORE® processor, ITANIUM® processor, XEON® processor, CELERON® processor or other line of processors, etc. The processor 404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 404 may be disposed in communication with one or more input/output (I/O) devices via an I/O interface 406. The I/O interface 406 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphic array (VGA), IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 406, computer system 402 may communicate with one or more I/O devices. For example, an input device 408 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 410 may be a printer, fax machine, video display (for example, cathode ray tube (CRT), liquid crystal display (LCD), light-emitting diode (LED), plasma, or the like), audio speaker, etc. In some embodiments, a transceiver 412 may be disposed in connection with processor 404. The transceiver 412 may facilitate various types of wireless transmission or reception. For example, transceiver 412 may include an antenna operatively connected to a transceiver chip (for example, TEXAS INSTRUMENTS® WILINK WL1286® transceiver, BROADCOM® BCM4550IUB8® transceiver, INFINEON TECHNOLOGIES® X-GOLD 418-PMB9800® transceiver, or the like), providing IEEE 802.11 a/b/g/n, Bluetooth, FM, global positioning system (GPS), 2G/'G HSDPA/HSUPA communications, etc.

In some embodiments, the processor 404 may be disposed in communication with a communication network 414 via a network interface 416. The network interface 416 may communicate with the communication network 414. The network interface 416 may employ connection protocols including, without limitation, direct connect, Ethernet (for example, twisted pair 10/100/1000 Base T), transmission control protocol/internet protocol (TCP/IP), token ring, IEEE 802.11 a/b/g/n/x, etc. The communication network 414 may include, without limitation, a direct interconnection, local area network (LAN), wide area network (WAN), wireless network (for example, using Wireless Application Protocol), the Internet, etc. Using the network interface 416 and the communication network 414, the computer system 402 may communicate with devices 418, 420, and 422. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 402 may itself embody one or more of these devices.

In some embodiments, the processor 404 may be disposed in communication with one or more memory devices (for example, RAM 426, ROM 428, etc.) via a storage interface 424. The storage interface 424 may connect to memory 430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory 430 may store a collection of program or database components, including, without limitation, an operating system 432, user interface application 434, web browser 436, mail server 438, mail client 440, user/application data 442 (for example, any data variables or data records discussed in this disclosure), etc. The operating system 432 may facilitate resource management and operation of the computer system 402. Examples of the operating systems 432 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP®, Vista®/7/8, etc.), APPLE® IOS® platform, GOOGLE® ANDROID® platform, BLACKBERRY® OS platform, or the like. The user interface 434 may facilitate display, execution, interaction, manipulation, or operation of program components through textual or graphical facilities. For example, user interfaces may provide computer interaction interface elements on a display system operatively connected to the computer system 402, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX®, JAVA® programming language, JAVASCRIPT® programming language, AJAX® programming language, HTML, ADOBE® FLASH®, etc.), or the like.

In some embodiments, the computer system 402 may implement the web browser 436 stored program component. The web browser 436 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. The web browsers 436 may utilize facilities such as AJAX®, DHTML, ADOBE® FLASH®, JAVASCRIPT®, JAVA®, application programming interfaces (APIs), etc. In some embodiments, the computer system 402 may implement the mail server 438 stored program component. The mail server 438 may be an Internet mail server such as MICROSOFT® EXCHANGE® mail server, or the like. The mail server 438 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. The mail server 438 may utilize communication protocols such as internet message access protocol (IMAP), messaging application programming interface (MAPI), MICROSOFT'® EXCHANGE®, post office protocol (POP), simple mail transfer protocol (SMTP), or the like. In some embodiments, the computer system 402 may implement the mail client 440 stored program component. The mail client 440 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, the computer system 402 may store the user/application data 442, such as the data, variables, records, etc. as described in this disclosure. Such databases may be implemented as fault-tolerant, relational, scalable, secure databases such as ORACLE® database or SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above are not routine, or conventional, or well understood in the art. The techniques discussed above provide for a modified ANN model that is improved/optimized for performance. In particular, the techniques provide for reduction in the number of layers of the ANN model, thereby reducing the processing time and increasing the prediction speed. Additionally, the modified ANN model with reduced number of layers is resource efficient in so much so that it doesn't require high-end processing infrastructure. Thus, the techniques may be effectively employed for real-time applications. For example, the techniques may be employed for real-time traffic density prediction in automatic signal controller.

Further, the techniques provide for identification and removal of unwanted layers in the ANN model with negligible or positive impact on the relative loss, thereby not impacting or positively impacting the accuracy of the modified ANN model. In other words, only those layers that do not impact the performance of ANN model are pruned. Thus, the modified ANN model not only gives a better performance in terms of prediction time, but also gives a better or same performance in terms of prediction accuracy. Moreover, the techniques described above may be easily deployed in any cloud-based servers for access and use as an 'application as a service' by any computing device including mobile device or automatic signal controller. For example, the ANN improvement device 101 may be implemented on a cloud-based server and used for optimizing/improving various deep learning model based mobile device applications.

The disclosed method and system try to overcome the technical problem of inefficient and complex ANN models. The method and system provide for a robust and efficient mechanism for optimizing/improving the ANN model by pruning of layers in an ANN model based on its relative impact on the ANN model or the output accuracy. The evaluation of relative loss is a critical aspect in the ANN model for real-time applications where prediction accuracy as well as prediction time is of importance. Specifically, the claimed limitations of the present disclosure address the technical challenge by assigning a random activation threshold value to each activation function corresponding to each neuron of the ANN model, determining activated neurons in each layer for a majority of input data in the input dataset based on the random activation threshold value for each activation function, identifying removable layers based on a number of activated neurons and a pre-defined threshold value, evaluating a relative loss of the ANN model upon removing each removable layer from the ANN model and for a random input data in the input dataset, and deriving a modified ANN model by removing one or more of the removable layers based on the evaluation.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for improving performance of an artificial neural network (ANN) model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for improving performance of an artificial neural network (ANN) model, the method comprising:
receiving, by an ANN improvement device, an ANN model and input dataset, wherein the ANN model comprises a plurality of neurons arranged in a plurality of layers and employing a plurality of corresponding activation functions;
assigning, by the ANN improvement device, a random activation threshold value to each of the plurality of corresponding activation functions, wherein the random activation threshold value is selected from a pre-defined range for each of the plurality of corresponding activation functions;
executing, by the ANN improvement device, the ANN model on a majority of input data in the input dataset to determine an activation value corresponding to each of the neurons;
determining, by the ANN improvement device, whether the activation value for a neuron exceeds the random activation threshold value assigned for the neuron;
identifying, by the ANN improvement device, the neuron as an activated neuron when the activation value for the neuron exceeds the random activation threshold value assigned for the neuron;
determining, by the ANN improvement device, a set of activated neurons in each of the plurality of layers for a majority of input data in the input dataset, based on the identified activated neuron;
identifying, by the ANN improvement device, a set of removable layers based on a number of activated neurons in the set of activated neurons and a pre-defined threshold value;

for each of the set of removable layers and for a random set of input data in the input dataset, evaluating, by the ANN improvement device, a relative loss of the ANN model upon removing a removable layer from the ANN model; and deriving, by the ANN improvement device, a modified ANN model by removing one or more of the set of removable layers based on the evaluation.

2. The method of claim 1, further comprising, iteratively:

assigning a new random activation threshold value to each of the plurality of corresponding activation functions, wherein the new random activation threshold value is selected from the pre-defined range for each of the plurality of corresponding activation functions and is based on the random activation threshold value;

identifying a set of new removable layers based on the new random activation threshold value for each of the plurality of corresponding activation functions; and for each of the set of new removable layers and for the random set of input data, evaluating the relative loss of the ANN model upon removing a new removable layer from the ANN model.

3. The method of claim 2, wherein the iteration is performed:

for each of a plurality of activation threshold values in the pre-defined range; or till an increase in the relative loss of the ANN model.

4. The method of claim 1, wherein evaluating the relative loss upon removing the removable layer comprises:

determining a control event rate based on a number of correct predictions, made by the ANN model, for a first random set of input data;

determining an experimental event rate based on a number of correct predictions, made by the ANN model upon removing the removable layer, for a second random set of input data; and determining the relative loss based on the control event rate and the experimental event rate.

5. The method of claim 1, wherein removing the one or more of the set of removable layers comprises removing one or more layers that result in an about same or a lower relative loss.

6. The method of claim 1, wherein the input dataset comprises one of: training dataset for training the ANN model, or test dataset for testing the ANN model.

7. The method of claim 1, wherein each of the pre-defined range and the pre-defined threshold value is user-defined.

8. The method of claim 1, wherein the majority of input data comprises all of input data in the input dataset.

9. The method of claim 1, wherein the ANN model comprises a deep learning model, and wherein the deep learning model is trained for a real-time image processing application or a real-time language processing application.

10. A system for improving performance of an artificial neural network (ANN) model, the system comprising:

a processor; and a memory communicatively coupled to the processor, wherein the memory stores processor-executable instructions, which, on execution, causes the processor to:

receive an ANN model and input dataset, wherein the ANN model comprises a plurality of neurons arranged in a plurality of layers and employing a plurality of corresponding activation functions;

assign a random activation threshold value to each of the plurality of corresponding activation functions, wherein the random activation threshold value is selected from a pre-defined range for each of the plurality of corresponding activation functions;

execute the ANN model on a majority of input data in the input dataset to determine an activation value corresponding to each of the neurons;

determine whether the activation value for a neuron exceeds the random activation threshold value assigned for the neuron;

identify the neuron as an activated neuron when the activation value for the neuron exceeds the random activation threshold value assigned for the neuron;

determine a set of activated neurons in each of the plurality of layers for a majority of input data in the input dataset, based on the identified activated neuron;

identify a set of removable layers based on a number of activated neurons in the set of activated neurons and a pre-defined threshold value;

for each of the set of removable layers and for a random set of input data in the input dataset, evaluate a relative loss of the ANN model upon removing a removable layer from the ANN model; and derive a modified ANN model by removing one or more of the set of removable layers based on the evaluation.

11. The system of claim 10, wherein the processor-executable instructions further cause the processor to, iteratively:

assign a new random activation threshold value to each of the plurality of corresponding activation functions, wherein the new random activation threshold value is selected from the pre-defined range for each of the plurality of corresponding activation functions and is based on the random activation threshold value;

identify a set of new removable layers based on the new random activation threshold value for each of the plurality of corresponding activation functions; and evaluate the relative loss of the ANN model upon removing a new removable layer from the ANN model, for each of the set of new removable layers and for the random set of input data.

12. The system of claim 11, wherein the iteration is performed:

for each of a plurality of activation threshold values in the pre-defined range; or till an increase in the relative loss of the ANN model.

13. The system of claim 10, wherein evaluating the relative loss upon removing the removable layer comprises:

determine a control event rate based on a number of correct predictions, made by the ANN model, for a first random set of input data;

determine an experimental event rate based on a number of correct predictions, made by the ANN model upon removing the removable layer, for a second random set of input data; and determine the relative loss based on the control event rate and the experimental event rate.

14. The system of claim 10, wherein removing the one or more of the set of removable layers comprises removing one or more layers that result in an about same or a lower relative loss.

15. The system of claim 10, wherein the input dataset comprises one of: training dataset for training the ANN model, or test dataset for testing the ANN model.

16. The system of claim 10, wherein each of the pre-defined range and the pre-defined threshold value is user-defined.

17. The system of claim 10, wherein the majority of input data comprises all of input data in the input dataset.

18. The system of claim 10, wherein the ANN model comprises a deep learning model, and wherein the deep learning model is trained for a real-time image processing application or a real-time language processing application.

19. A non-transitory computer-readable medium storing computer-executable instructions for:
  receiving an ANN model and input dataset, wherein the ANN model comprises a plurality of neurons arranged in a plurality of layers and employing a plurality of corresponding activation functions;
  assigning a random activation threshold value to each of the plurality of corresponding activation functions, wherein the random activation threshold value is selected from a pre-defined range for each of the plurality of corresponding activation functions;
  executing the ANN model on a majority of input data in the input dataset to determine an activation value corresponding to each of the neurons;
  determining whether the activation value for a neuron exceeds the random activation threshold value assigned for the neuron;
  identifying the neuron as an activated neuron when the activation value for the neuron exceeds the random activation threshold value assigned for the neuron;
  determining a set of activated neurons in each of the plurality of layers for a majority of input data in the input dataset, based on the identified activated neuron;
  identifying a set of removable layers based on a number of activated neurons in the set of activated neurons and a pre-defined threshold value;
  for each of the set of removable layers and for a random set of input data in the input dataset, evaluating a relative loss of the ANN model upon removing a removable layer from the ANN model; and
  deriving a modified ANN model by removing one or more of the set of removable layers based on the evaluation.

20. The non-transitory computer-readable medium of claim 19, wherein evaluating the relative loss upon removing the removable layer comprises:
  determining a control event rate based on a number of correct predictions, made by the ANN model, for a first random set of input data;
  determining an experimental event rate based on a number of correct predictions, made by the ANN model upon removing the removable layer, for a second random set of input data; and
  determining the relative loss based on the control event rate and the experimental event rate.

* * * * *